United States Patent Office 3,825,656
Patented July 23, 1974

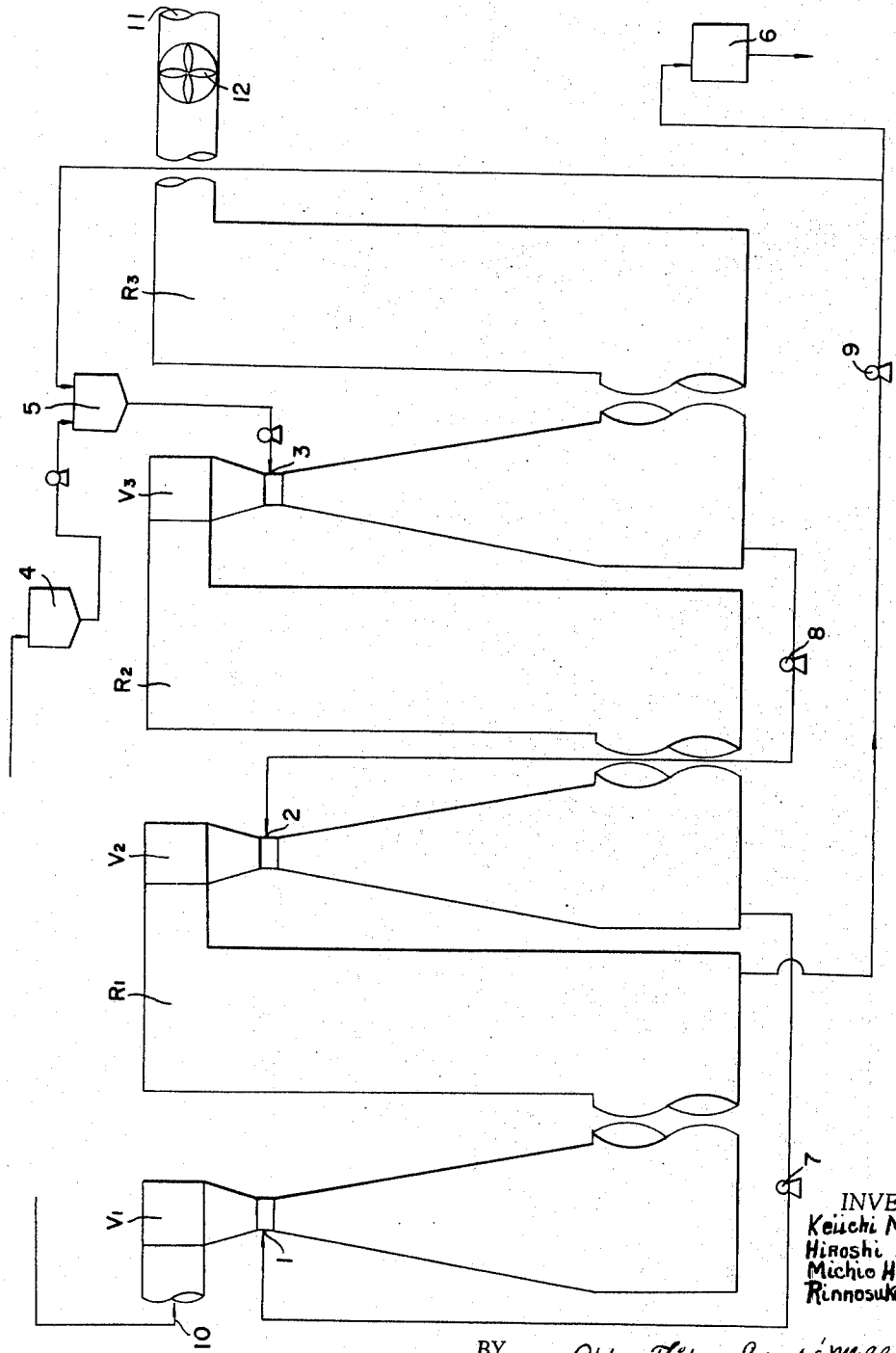

3,825,656
PROCESS FOR PREPARING HEXAGONAL SYSTEM PRISMATIC CALCIUM SULFITE
Keiichi Murakami, Sendai, Hiroshi Hoshi, Narashino, Michio Hirakawa, Ichikawa, and Rinnosuke Susuki, Tokyo, Japan, assignors to Lion Fat and Oil Company, Ltd., Tokyo, Japan
Filed Dec. 16, 1971, Ser. No. 208,602
Claims priority, application Japan, Dec. 26, 1970, 45/129,628
Int. Cl. C01f *11/48*
U.S. Cl. 423—512        8 Claims

ABSTRACT OF THE DISCLOSURE

Hexagonal system prismatic calcium sulfite, which is useful as a filler for thermoplastic resins, is prepared by contacting an $SO_2$-containing gas with a suspension of calcium hydroxide, precipitated calcium carbonate, or mixtures thereof wherein the $SO_2$-containing gas is passed continuously through a plurality of contact zones in which the first of said zones has a temperature of 50°–100° C. and a pH of 3–6 and each succeeding contact zone has a temperature of 50°–100° C. and a pH of higher than 6, while simultaneously passing the suspension through said plurality of contact zones counter-currently to the direction of the flow of the $SO_2$-containing gas.

BACKGROUND OF THE INVENTION

Field of the Invention

This invention relates generally to the formation of hexagonal system prismatic calcium sulfite which may be advantageously used as a filler material for thermoplastic resins.

Description of Prior Art

Calcium sulfite is often used to increase the rigidity of thermoplastic resin sheet material, particularly high density polyethylene sheet. However, its effectiveness for this purpose has not been as high as anticipated, particularly because the conventional techniques for preparing calcium sulfite usually results in a fine crystalline form having a particle size of less than $3\mu$. Conventionally calcium sulfite has been prepared by feeding $SO_2$ gas in concentrations of less than 1%, into milk of lime. However, at these low gas concentrations, it has been quite difficult to obtain a uniform rate of $SO_2$ feed, and the resulting crystals of $CaSO_3 \cdot \frac{1}{2}H_2O$ are usually less than $3\mu$ in particle size.

Although it has been possible to obtain calcium sulfite in particle sizes of greater than $3\mu$, these large particle sizes have only been obtainable by flocculation methods. Flocculation methods, however, do not result in the formation of a prismatic single crystal form of calcium sulfite, which has been found to be necessary for successful use as a filler.

When $Ca(OH)_2$ is reacted with $SO_2$, the reaction will be terminated while the reaction mixture is still in an alkaline condition, so that the degree of productivity of calcium sulfite is quite low. The calcium sulfite prepared by that method is amorphous and usually has a particle size of about $3\mu$. If the reaction is continued into the acidic region, these small particles will be converted into the colloidal form, since the solubility of small particle size calcium sulfite is quite high in an acidic solution of sulfurous acid.

It has now been discovered that the usefulness of calcium sulfite as a thermoplastic resin filler will be substantially improved if it is used in the form of hexagonal system prismatic crystals having a particle size of more than $3\mu$, and particularly more than $5\mu$.

SUMMARY OF THE INVENTION

Accordingly, it is one object of this invention to provide a process for preparing hexagonal system prismatic crystals of calcium sulfite, which can be used as a filler for thermoplastic resins.

This and other objects, as will hereinafter become more readily apparent, has been achieved by counter-currently contacting an $SO_2$-containing exhaust gas with milk of lime, or a suspension of precipitated calcium carbonate, or a mixture of slaked lime and precipitated calcium carbonate, or a mixture of slaked lime, precipitated calcium carbonate and calcium sulfite, in an apparatus, such as a venturi scrubber or spray tower, which will absorb the dilute $SO_2$-containing exhaust gas.

In particular, the objects of this invention have been achieved by contacting $SO_2$-containing gas with a suspension of calcium hydroxide, precipitated calcium carbonate, or a mixture thereof. The $SO_2$-containing gas is continuously fed through a series of contact zones while the suspension is fed counter-currently through said series of contact zones so as to contact the gas with the suspension. The first contact zone in the series is maintained at a temperature of from 50°–100° C. and a pH of 3–6, and each succeeding contact zone is maintained at temperatures of from 50°–100° C. and pH's of higher than 6.

BRIEF DESCRIPTION OF THE DRAWING

The Figure is a schematic view illustrating one embodiment of the apparatus used for the process of this invention.

DETAILED DESCRIPTION OF PREFERRED EMBODIMENTS

According to this invention, hexagonal system prismatic calcium sulfite is prepared by counter-currently contacting $SO_2$-containing gas to a suspension of $Ca(OH)_2$, $CaCO_3$, or a mixture of $Ca(OH)_2$ and $CaCO_3$, or $Ca(OH)_2$, $CaCO_3$ and $CaSO_3 \cdot \frac{1}{2}H_2O$ in an apparatus such as a venturi scrubber and spraying tower, so that $SO_2$ is absorbed and reacted and a part of the resulting product is recycled.

Referring now to the Figure, the reaction apparatus for reacting $SO_2$ with milk of lime or a suspension of precipitated calcium carbonate or a mixture thereof, comprises venturi scrubbers V1, V2 and V3, and gas-liquid separators R1, R2 and R3. $SO_2$-containing gas is fed through duct 10 through the venturi scrubber and the gas-liquid separator V1→R1→V2→R2→V3→R3 and is driven by blower 12 and exhausted through duct 11.

The milk of lime is fed from the milk of lime tank 4 to a recycling solution tank 5 and is fed at an equivalent concentration to that of the $SO_2$, to the venturi nozzle 3, wherein the milk of lime is reacted with the $SO_2$ which has not been absorbed in the venturi scrubbers V1 and V2. It is then fed through $R_3$ and the pump 8 to the venturi nozzle 2 and further reacted with $SO_2$ which is not absorbed in V1. It is then fed through the gas-liquid separator R2 and the pump 7 to the venturi nozzle 1 in which the reaction is conducted at a pH of 3–6, preferably about 5. The unreacted slaked lime or calcium carbonate is completely converted to calcium sulfite and crystal growth of the resulting calcium sulfite is provided by maintaining a slight acidic condition.

A portion of the liquid separated in the gas-liquid separator R1 is recycled through pump (not shown in drawing), and the remainder is fed through pump 9 to the pH adjusting tank 6. In this tank 6, the pH is adjusted to 7–9 and then is filtered and dried to prepare the final product.

The $SO_2$-containing gas used for the process of this invention can be any high concentration $SO_2$-containing gas such as prepared by combustion of sulfur or iron pyrite. It may alternatively be a dilute, $SO_2$-containing gas, such as boiler exhaust gas. Even though boiler exhaust gas is usually contaminated with dust, the dust can be removed by the use of a suitable dust collector, such as a washing tower, so that contamination difficulties can be avoided.

Conventional milk of lime can be used herein such as that prepared by calcination of limestone in a shaft kiln and then hydrating the resulting quick lime. Hydration is effected preferably at a temperature of higher than 90° C. The concentration of milk of lime used should be from 20 wt. percent to 0.1 wt. percent and preferably from 10 wt. percent to 5 wt. percent, and the milk of lime will be fed to the recycling milk of lime depending on its condition.

The precipitated calcium carbonate can be prepared by reacting $CO_2$ with milk of lime. Preferably, the precipitated calcium carbonate used will have a size of less than $1\mu$ which can be prepared by reacting the $CO_2$ gas in the system with the milk of lime.

The reaction of this invention can be shown by the following schematic:

$$Ca(OH)_2 + CO_2 \rightarrow CaCO_3 H_2O \quad (1)$$

$$CaCO_3 + SO_2 + \tfrac{1}{2}H_2O \rightarrow CaSO_3 \cdot \tfrac{1}{2}H_2O + CO_2 \quad (2)$$

$$Ca(OH_2) + SO_2 \rightarrow CaSO_3 \cdot \tfrac{1}{2}H_2O + \tfrac{1}{2}H_2O \quad (3)$$

$$CaSO_3 \tfrac{1}{2}H_2O + SO_2 + \tfrac{1}{2}H_2O \rightleftharpoons Ca(HSO_3)_2 \quad (4)$$

When the $SO_2$-containing gas contains a small amount of $CO_2$ gas, such as will occur in exhaust gas obtained by the partial combustion of $H_2S$, the reactions (3) and (4) will predominate. On the other hand, when the $SO_2$-containing gas contains a large amount of $CO_2$ gas, such as is found in boiler exhaust gas, all the reactions (1), (2), (3) and (4) will occur.

The reaction (1) will occur in an alkaline solution, and the resulting calcium carbonate will be fine particles of less than $1\mu$ in size. These are easily converted into $CaSO_3 \cdot \tfrac{1}{2}H_2O$ by contact with $SO_2$, as shown in the reaction formula (2). In this latter reaction, the solution will become acidic and the $CaSO_3 \cdot 1/1H_2O$ will be grown to large particle size hexagonal system prismatic crystals of calcium sulfite by reaction (4). The reaction (3) will occur when the solution is alkaline and the resulting $CaSO_3 \cdot \tfrac{1}{2}H_2O$ will have a fine crystal structure of about $3\mu$ in particle diameter. The reaction (4) will occur when the pH of the solution is acidic. Accordingly, the crystals of $CaSO_3 \cdot \tfrac{1}{2}H_2O$ can be grown by adding $Ca(OH)_2$ to $Ca(HSO_3)_2$, or by removing $SO_2$ from $Ca(HSO_3)_2$ so as to shift the equilibrium reaction (4) in the direction of the desired product. The reactions (1) and (3) are neutralization reactions and accordingly these processes are quite simple. Moreover, reactions (2) and (4) can be provided simply by converting the solution to an acidic condition, so that these processes are also quite simple.

In order to increase the reaction velocity of reaction (2) in each of these four reactions, it is necessary to produce fine particles of calcium carbonate of less than $1\mu$ in diameter. In the reaction of milk of lime and $CO_2$ gas, the velocity of the absorbing reaction will be decreased if the reaction temperature is from 0° C. to 100° C., so that the calcium carbonate produced within this temperature range will have a particle size diameter of less than $1\mu$.

The reaction (2) is quite slow as compared with the reaction (3) of $SO_2$ and $Ca(OH)_2$, and accordingly the resulting product will consist mainly of $CaSO_3 \cdot \tfrac{1}{2}H_2O$ when $SO_2$ gas and $CO_2$ gas are fed. Accordingly, the $CaCO_3$ resulting from the reaction (1) is quite useful for producing large size calcium sulfite crystals, since reaction (2) will occur in an acidic condition.

In accordance with this invention, it is most preferable to use the continuous process apparatus as shown in the figure. The apparatus, however, can be horizontally arranged as shown or vertically arranged depending upon the particular reaction conditions. The product obtained by the subject reaction will usually have particle diameters of $5$–$50\mu$. The actual particle size can be controlled by selecting the conditions within V1, and particularly the pH and the residence time, i.e., recycling ratio. The resulting slurry is neutralized with a small amount of $Ca(OH)_2$ to provide a pH 7–9, and the filtering and drying of the slurry can be conducted by use of such conventional apparatus as ordinary suction filters, rotary kiln driers, etc.

The product $CaSO_3 \cdot \tfrac{1}{2}H_2O$ having a particle diameter of $5$–$50\mu$ can be admixed with a resinous polymer, such as high density polyethylene, in a ratio of 5–90 percent by weight and the mixture is kneaded. The filler may, alternatively, be admixed with the resinous polymer with other fillers, such as $3\mu$ diameter $CaSO_3 \cdot \tfrac{1}{2}H_2O$ in a ratio of 5–90 percent by weight based on the total weight of filler.

Among the more interesting aspects by this invention, is that since $SO_2$ is easily and continuously absorbed for the reaction, it is a quite effective technique for reducing $SO_2$ air pollution. This invention can be used for growing crystals of calcium sulfite, whereby particle size control is necessary.

Having generally described the invention, a further understanding can be obtained by reference to certain specific Examples which are provided herein for purposes of illustration only and are not intended to be limiting in any manner unless otherwise specified.

EXAMPLE (Experiment)

(A)

Temperature of calcium hydroxide dispersion:

|    | ° C. |
|----|------|
| V1 | 98   |
| V2 | 99   |
| V3 | 90   |

Temperature of $SO_2$-containing gas:

|    | ° C. |
|----|------|
| V1 | 420  |
| V2 | 90   |
| V3 | 90   |

(B)

Temperature of calcium hydroxide dispersion:

|    | ° C. |
|----|------|
| V1 | 85   |
| V2 | 70   |
| V3 | 70   |

Temperature of $SO_2$-containing gas:

|    | ° C. |
|----|------|
| V1 | 100  |
| V2 | 70   |
| V3 | 70   |

(C)

Temperature of calcium hydroxide dispersion:

|    | ° C. |
|----|------|
| V1 | 70   |
| V2 | 50   |
| V3 | 50   |

Temperature of $SO_2$-containing gas:

|    | ° C. |
|----|------|
| V1 | 100  |
| V2 | 50   |
| V3 | 50   |

(Reference)

Temperature of calcium hydroxide dispersion:

| | °C. |
|---|---|
| V1 | 30 |
| V2 | 20 |
| V3 | 20 |

Temperature of $SO_2$-containing gas:

| | °C. |
|---|---|
| V1 | 30 |
| V2 | 20 |
| V3 | 20 |

Formulation of $SO_2$-containing gas (mole percent)

| | I | II | III |
|---|---|---|---|
| $O_2$ | 1.4 | 13.3 | 28.0 |
| $N_2$ | 64.9 | 78.8 | 57.0 |
| $SO_2$ | 0.3 | 7.9 | 15.0 |
| $CO_2$ | 2.1 | | |
| $H_2O$ | 31.3 | | |
| Total | 100.0 | 100.0 | 100.0 |
| | Exhaust gas from heavy oil boiler | Sulfur burning gas | Sulfur burning gas |

(A) Condition of A:

| Type of gas | Concentration Ca(OH)$_2$ (percent) | pH V1 | pH V2 | pH V3 | Concentration of $SO_2$ (p.p.m.) V1 in | V2 in | V3 in | V3 out | Young's modulus (kg./cm.$^2$) | Softness (mg.) | Processability |
|---|---|---|---|---|---|---|---|---|---|---|---|
| I | 5 | 5.2 | 10.0 | 12.3 | 9,000 | 7,000 | 900 | 0 | 28,700 | 820 | Good. |
| I | 10 | 5.5 | 10.0 | 12.3 | 9,000 | 6,500 | 800 | 0 | 29,600 | 810 | Do. |
| I | 15 | 6.0 | 8.0 | 12.3 | 9,000 | 6,000 | 700 | 0 | 38,900 | 1,061 | Excellent. |
| II | 5 | 4.3 | 7.8 | 12.3 | 79,000 | 40,000 | 3,000 | 0 | 82,200 | 986 | Good. |
| II | 10 | 4.5 | 9.5 | 12.3 | 79,000 | 35,000 | 2,500 | 0 | 28,100 | 796 | Do. |
| II | 15 | 4.9 | 11.1 | 12.3 | 79,000 | 50,000 | 3,500 | 0 | 27,100 | 803 | Do. |
| III | 5 | 3.0 | 9.0 | 12.3 | 150,000 | 100,000 | 5,000 | 0 | 27,800 | 932 | Do. |
| III | 10 | 3.5 | 7.9 | 12.3 | 150,000 | 70,000 | 4,000 | 0 | 27,300 | 786 | Do. |
| III | 15 | 3.9 | 8.8 | 12.3 | 150,000 | 80,000 | 4,500 | 0 | 26,400 | 820 | Do. |
| I | 10 | 8.5 | 11.5 | 12.3 | 9,000 | 80 | 0 | 0 | 23,500 | 760 | Fair. |

(B) Condition of B:

| Type of gas | Concentration Ca(OH)$_2$ (percent) | pH V1 | pH V2 | pH V3 | Concentration of $SO_2$ (p.p.m.) V1 in | V2 in | V3 in | V3 out | Young's modulus (kg./cm.$^2$) | Softness (mg.) | Processability |
|---|---|---|---|---|---|---|---|---|---|---|---|
| I | 5 | 5.2 | 7.8 | 12.3 | 9,000 | 7,000 | 950 | 0 | 28,500 | 724 | Good. |
| I | 10 | 5.5 | 8.5 | 12.3 | 9,000 | 6,500 | 870 | 0 | 29,200 | 832 | Do. |
| I | 15 | 6.0 | 8.8 | 12.3 | 9,000 | 6,000 | 730 | 0 | 39,900 | 1,100 | Excellent. |
| II | 5 | 4.4 | 10.2 | 12.3 | 79,000 | 45,000 | 3,500 | 0 | 37,200 | 1,000 | Good. |
| II | 10 | 4.7 | 9.6 | 12.3 | 79,000 | 50,000 | 4,500 | 0 | 27,100 | 928 | Do. |
| II | 15 | 4.9 | 11.1 | 12.3 | 79,000 | 35,000 | 2,500 | 0 | 27,300 | 865 | Do. |
| III | 5 | 3.1 | 8.3 | 12.3 | 150,000 | 110,000 | 6,500 | 0 | 29,000 | 796 | Do. |
| III | 10 | 3.6 | 9.5 | 12.3 | 150,000 | 90,000 | 4,800 | 0 | 28,200 | 782 | Do. |
| III | 15 | 4.0 | 9.9 | 12.3 | 150,000 | 85,000 | 5,000 | 0 | 29,000 | 824 | Do. |
| II | 10 | 9.5 | 11.8 | 12.3 | 79,000 | 500 | 0 | 0 | 24,000 | 716 | Fair. |

(C) Condition of C:

| Type of gas | Concentration Ca(OH)$_2$ (percent) | pH V1 | pH V2 | pH V3 | Concentration of $SO_2$ (p.p.m.) V1 in | V2 in | V3 in | V3 out | Young's modulus (kg./cm.$^2$) | Softness (mg.) | Processability |
|---|---|---|---|---|---|---|---|---|---|---|---|
| I | 5 | 5.3 | 7.5 | 12.3 | 9,000 | 6,800 | 800 | 0 | 24,800 | 728 | Good. |
| I | 10 | 5.7 | 6.8 | 12.3 | 9,000 | 5,900 | 780 | 0 | 25,000 | 786 | Do. |
| I | 15 | 5.9 | 7.3 | 12.3 | 9,000 | 4,900 | 650 | 0 | 37,600 | 1,046 | Excellent. |
| II | 5 | 4.3 | 10.2 | 12.3 | 79,000 | 44,000 | 2,800 | 0 | 37,200 | 989 | Good. |
| II | 10 | 4.8 | 10.0 | 12.3 | 79,000 | 49,000 | 3,900 | 0 | 29,000 | 908 | Do. |
| II | 15 | 5.0 | 9.9 | 12.3 | 79,000 | 35,000 | 4,200 | 0 | 28,600 | 868 | Do. |
| III | 5 | 3.3 | 7.8 | 12.3 | 150,000 | 95,000 | 6,300 | 0 | 27,200 | 801 | Do. |
| III | 10 | 3.6 | 8.2 | 12.3 | 150,000 | 89,000 | 5,700 | 0 | 26,000 | 796 | Do. |
| III | 15 | 3.8 | 8.4 | 12.3 | 150,000 | 79,000 | 4,300 | 0 | 27,200 | 788 | Do. |
| III | 10 | 10.0 | 12.0 | 12.3 | 150,000 | 80,000 | 5,200 | 0 | 24,800 | 736 | Fair. |

(D) Condition of D:

| Type of gas | Concentration Ca(OH)$_2$ (percent) | pH V1 | pH V2 | pH V3 | Concentration of $SO_2$ (p.p.m.) V1 in | V2 in | V3 in | V3 out | Young's modulus (kg./cm.$^2$) | Softness (mg.) | Processability |
|---|---|---|---|---|---|---|---|---|---|---|---|
| I | 10 | 5.2 | 10.0 | 12.3 | 9,000 | 7,000 | 900 | 0 | 23,800 | 731 | Fair. |
| II | 10 | 4.5 | 9.5 | 12.3 | 79,000 | 40,000 | 3,000 | 0 | 21,600 | 718 | Do. |
| III | 10 | 3.8 | 8.9 | 12.3 | 15,000 | 100,000 | 5,000 | 0 | 23,000 | 725 | Do. |
| I | 10 | 8.8 | 10.2 | 12.3 | 9,000 | 7,000 | 900 | 0 | 22,300 | 745 | Fair. |

Having now fully described the invention, it will be apparent to one of ordinary skill in the art, that many changes and modifications can be made thereto without departing from the spirit or scope of the invention.

Accordingly, what is claimed as new and desired to be secured by Letters Patent is:

1. In a process for preparing hexagonal system prismatic crystals of calcium sulfite by contacting $SO_2$ containing gas with a suspension of calcium hydroxide, precipitated calcium carbonate, or mixture thereof, the improvement comprising continuously passing an $SO_2$ containing gas through a plurality of contact zones in which the first of said zones has a temperature of 50–100° C. and a pH of 3–6, and each succeeding contact zone has a temperature of 50–100° C. and a pH of higher than 6; and simultaneously continuously passing said suspension through said plurality of contact zones, counter-currently to the direction of flow of said $SO_2$-containing gas, wherein fine particles of calcium sulfite, having an average diameter less than $3\mu$ are produced in the last contact zone and hexagonal prismatic crystals of calcium sulfite having a particle size of greater than $5\mu$ in average diameter are grown in the first contact zone.

2. The process according to Claim 1, wherein said suspension is a milk of lime.

3. The process according to Claim 1, wherein said $SO_2$-containing gas is an exhaust gas containing $SO_2$.

4. The process according to Claim 1, wherein said $SO_2$-containing gas is produced by combustion of sulfur or iron pyrite.

5. The process according to Claim 2, wherein the concentration of said milk of lime in said last contact zone is from about 20 wt. percent to 0.2 wt. percent.

6. The process according to Claim 2, wherein said $SO_2$-containing gas contains $CO_2$ gas so that the precipitated calcium carbonate is converted to milk of lime.

7. The process according to Claim 1, wherein fine particles of calcium sulfite are produced in the second contact zone to the last contact zone, and the product calcium sulfite particles are grown in the first contact zone.

8. The process according to Claim 1, wherein said suspension is fed with said $SO_2$-containing gas in each contact zone, while said suspension is fed from the last contact zone to the first contact zone and said $SO_2$-containing gas is fed from the first contact zone to the last contact zone.

References Cited

UNITED STATES PATENTS

| | | | |
|---|---|---|---|
| 2,210,405 | 8/1940 | Haywood | 423—512 |
| 1,984,188 | 12/1934 | Haywood | 423—512 X |

EARL C. THOMAS, Primary Examiner